(12) United States Patent
Chidel et al.

(10) Patent No.: US 8,214,429 B2
(45) Date of Patent: *Jul. 3, 2012

(54) INTERACTIVE TELEVISION FRAMEWORK UTILIZING PROGRAM-SYNCHRONOUS TRIGGERS AND STANDARD MESSAGING AND PRESENCE-DETECTION PROTOCOLS

(75) Inventors: Philip Chidel, Novato, CA (US); Douglas H. Crawford, San Francisco, CA (US); John Gilles, Alameda, CA (US); Julie Petrarca, Cleveland Heights, OH (US); Michael Ryan, San Francisco, CA (US)

(73) Assignee: Coincident.TV, Inc., Hillsborough, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,453

(22) Filed: Jan. 10, 2011

(65) Prior Publication Data

US 2011/0196917 A1 Aug. 11, 2011

Related U.S. Application Data

(63) Continuation of application No. 12/377,808, filed as application No. PCT/US2007/018263 on Aug. 17, 2007.

(60) Provisional application No. 60/822,740, filed on Aug. 17, 2006.

(51) Int. Cl.
*G06F 15/16* (2006.01)
(52) U.S. Cl. .......... 709/203; 709/227; 709/228; 725/87
(58) Field of Classification Search .......... 709/227, 709/228, 203; 725/87
See application file for complete search history.

(56) References Cited

U.S. PATENT DOCUMENTS

| | | | |
|---|---|---|---|
| 7,809,816 B2 | 10/2010 | Johnson et al. | |
| 2003/0032389 A1 | 2/2003 | Kim et al. | |
| 2003/0208754 A1 | 11/2003 | Sridhar et al. | |
| 2003/0229900 A1 | 12/2003 | Reisman | |
| 2005/0240680 A1 | 10/2005 | Costa-Requena et al. | |

OTHER PUBLICATIONS

U.S. Appl. No. 12/377,808, filed Feb. 24, 2011, Office Action, mailed Feb. 1, 2012.

*Primary Examiner* — Adnan Mirza
(74) *Attorney, Agent, or Firm* — Hickman Palermo Truong Becker Bingham Wong LLP

(57) ABSTRACT

A system for enabling nodes of a client-server network to interact with broadcast program content, the system includes a server node that can detect the presence on the network of one or more client nodes; a trigger extractor that can extract program-synchronous triggers from within the content of a broadcast program; and an application manager that, in response to extraction of a program-synchronous trigger from a broadcast program, can facilitate interactive communication, relating to the broadcast program content, between the server node and one or more client nodes whose presence on the network has been detected.

16 Claims, 4 Drawing Sheets

INTERACTIVE TELEVISION FRAMEWORK UTILIZING PROGRAM-SYNCHRONOUS TRIGGERS AND STANDARD MESSAGING AND PRESENCE-DETECTION PROTOCOLS

This application is a continuation of U.S. application Ser. No. 12/377,808, filed Feb. 17, 2009, and claims priority under 35 U.S.C. §120 to PCT/US2007/018263, filed Aug. 17, 2007, which claims priority to U.S. Provisional Application No. 60/822,740, filed Aug. 17, 2006, the contents of each application is incorporated herein by reference in its entirety.

BACKGROUND

Although interactive television (ITV) has been in an experimental mode for decades, few if any implementations have proven sufficiently successful to merit long-term acceptance. With the rapid advances in microprocessor speed, memory capacity and various related computer and broadcast audio and video technologies, including the advent of the Internet into the home, it might appear that the technical obstacles to the development of interactive television applications are diminishing.

While this may in part be the case, a number of significant barriers to interactive television application development remain. In particular, the lack of standards for deploying interactive content in a client-server communications environment has severely impeded the development of interactive television applications.

For example, ITV implementations typically insert specialized content into a broadcast program's "VBI" (vertical blanking interval, or metadata within the digital equivalent of the VBI for digital broadcasts) to trigger interaction between a program viewer and the purveyor of an interactive application (e.g., an advertiser, game provider or seller of various products or services). This content could be as simple as a URL that enables viewers to access Internet content related to a particular segment of the broadcast program. Or it could enable viewers to invoke and interact with a proprietary application, such as a game, or perhaps an informational or commercial service to research a related topic in greater depth, obtain a mortgage or other loan, or shop for related merchandise.

Prior ITV implementations typically rely on a scheduling mechanism, employing proprietary applications to manage interaction and communication with viewers. For example, such an application inserts specialized content "triggers" into a broadcast program at specific times known to the application. The application can then schedule intervals during which the viewer can interact synchronously with these triggers. Yet, if schedules change and content is broadcast at different times, it is extremely difficult to synchronize the insertion of these triggers with the appropriate segment of the broadcast content.

In addition to the overhead and inflexibility inherent in maintaining such triggering of interactive content, these applications also must handle client-server communications, including user authentication, presence detection and the exchange of messages for each particular interactive application.

Rather than leverage existing standards, these interactive applications have been either proprietary, requiring extensive development and integration within the environments of the broadcaster and interactive content provider, or relatively trivial, as is the case with simple URL triggers.

What is needed is a more standardized platform for the development of interactive applications that can leverage existing communications standards while still supporting complex applications that provide viewers with a rich interactive experience.

SUMMARY

The present invention is an enhanced television application that allows viewers to participate in a program-related service, such as a quiz or a game, on their PC or their TV, using content that is synchronous to the program they are watching. Program-synchronous games and applications are a proven method for boosting a program or network's brand and viewer loyalty.

For networks and program producers, the invention enables a creative tool to broaden a show's experience as well as a practical tool to keep viewers watching longer. It provides advertisers with new ways to target their ads to an increasingly disparate television viewing audience. Viewers are thus afforded a fun new way to get even more entertainment or information from their favorite television programs.

The invention includes a scalable ITV application framework. It utilizes triggers inserted directly into a program's VBI such that the program broadcast to clients and servers within the framework includes program-synchronous triggers. Upon detecting these program-synchronous triggers (each with its own unique ID) within a broadcast program, servers of the present invention then leverage existing communication standards to interact with clients to invoke and implement client-server ITV applications.

The framework of the present invention is built upon a Jabber communications layer—i.e., a set of streaming XML protocols, including the Extensible Messaging and Presence Protocol (XMPP), that has been the subject of various RFCs considered and approved by the Internet Engineering Task Force (IETF). The need to detect the presence of clients and servers, and enable them to send messages to one another is central to virtually any ITV application. By leveraging these communication standards, the present invention significantly simplifies and reduces the time required for the development of ITV applications, as well as enhancing their interoperability.

The system is made up of the following core components:
- VBI Triggers for storing program-synchronous trigger data
- Jabber communication layer
- Client Applications
- Jabber Software "Agents" for managing user interaction
- The Trigger Manager Application (TiM)
- A Content Management System (CMS)

During an enhanced broadcast, synchronous triggers are read from the program videotape and sent to a Jabber Agent via a socket connection using the XMPP protocol. The Jabber Agent translates the trigger into the appropriate content and then sends the appropriate message to the Jabber Server. The Jabber server broadcasts the message to all of the attached clients.

Trigger Insertion is handled via the Trigger Manager (TiM), a Flash-based GUI which can control playback on a video deck and insert the related triggers. Content Entry can be done via either a web-based content entry tool or the Trigger Manager itself. During live events, the Trigger Manager can bypass the VBI to send triggers to the attached clients via the Jabber Server.

DETAILED DESCRIPTION

Figure 1:
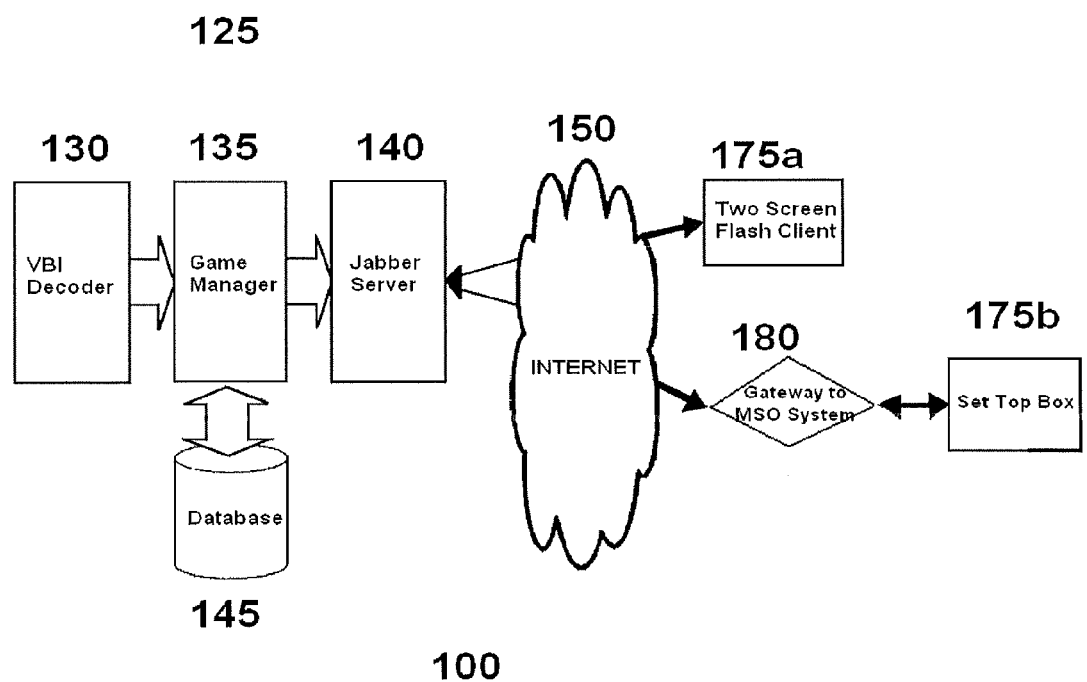
FIG. 1 illustrates a conceptual system architecture of the present invention.

Before examining the architecture of the present invention, it is helpful to introduce some of the key terminology used in describing components of the system.

Definitions

VBI—Short for Vertical Blanking Interval, the VBI is the part of a television transmission signal that is blanked, or left clear, of viewable content, to allow time for the television's electron gun to move from the bottom to the top of the screen as it scans images. The term is used herein to encompass digital (as well as analog) transmissions, in which a digital analogue of the VBI is represented by metadata occupying a portion of the bitstream to be broadcast. This blank area is currently being used to broadcast closed-caption and HTML-formatted information. Because the data is actually embedded with the content, the VBI can be used for inserting program-synchronous trigger data.

TCP/IP SOCKET—A TCP/IP Socket (Socket) is the core of most internet connections. It is the virtual pipe between two networked computers through which data is passed. The communication on this pipe is defined by a particular protocol (e.g., XMPP).

XMPP—XMPP is an open, XML-based protocol for near real-time extensible messaging and presence detection. It is the core protocol of the Jabber Instant Messaging and Presence technology. In a preferred embodiment of the present invention, XMPP is the language that is communicated over the TCP/IP Sockets.

JABBER—Jabber is a set of streaming XML protocols and technologies that enable any two entities on the Internet to exchange messages, presence, and other structured information in close to real time.

SERVER—A server is a computer or device on a network that manages network resources. An example is a web server that serves web pages or an email server that handles email. There are three main servers in one embodiment of the present invention: a Jabber server for handling communications, a Database server for storing data, and an Application server for processing data.

CLIENT—Typically, a client is an application that runs on a personal computer or workstation and relies on a server to perform certain operations. For example, an email client is an application that enables one to send and receive email. Similarly, a web browser is a client that interprets and displays web pages. In client-server architectures, a client designed to be relatively small with most of the data processing done on the server side is considered a thin client, as opposed to larger monolithic applications called thick clients. Most set-top-boxes are designed to be relatively thin clients.

GATEWAY—A gateway is a node on a network that serves as an entrance to another network. In the context of the present invention, a gateway can be used as an entrance to the ITV systems of a "Multiple System Operator" or MSO.

Overview

By inserting program-synchronous triggers into the VBI of a broadcast program, a server of the present invention can extract these triggers without regard to any prior schedule. For example, a program might be delayed and broadcast at a time later than was originally scheduled; yet, the program-synchronous triggers will still be broadcast during the appropriate portions of the broadcast program, enabling communication with clients at the appropriate time.

Unique program-synchronous trigger IDs also facilitate flexibility by enabling triggers to be independent of particular programs or time slots, as well as the application that it triggers. The same trigger could thus be used by different applications, as well as different providers.

Unlike prior systems, which relied on simple URLs that a client browser could use for navigation, or proprietary client-server applications, which required custom communications protocols for each application, the present invention relies on standard communication protocols (XMPP in a preferred embodiment) that simplify implementations of the basic forms of communication inherent in virtually any ITV application. These standard protocols also enable a rich set of core features, such as the ability to track presence information—e.g., while a user is interacting with a client application invoked by a particular trigger.

Turning to a preferred embodiment of the system architecture 100 of the present invention, as illustrated in FIG. 1, a client-server architecture is employed in which servers 125 as well as clients 175*a* and 175*b* can receive broadcast programs (not shown)—with program-synchronous triggers already inserted into the program being broadcast. Broadcasts can occur over virtually any broadcast medium, including cable (CATV), satellite (DBS) and terrestrial (OTA) systems.

Server 125 extracts program-synchronous triggers from broadcast programs (via VBI Decoder 130) and communicates with clients 175*a* and 175*b* over the Internet 150, typically via a TCP/IP connection. Such near real-time communication enables clients to respond to triggers at appropriate times (i.e., synchronously) while running client-server ITV applications (typically downloaded from Server 125 over the Internet 150).

Client devices can include personal computers running client applications, such as two-screen Flash client 175*a* (e.g., a PC or MAC), set-top boxes, such as client 175*b* (which communicates with the Internet 150 via MSO Gateway 180), as well as a vast array of other specialized and integrated computing devices, including televisions, digital video recorders, PDAs and mobile phones.

Servers such as server 125 include various components to perform generic core communication functions (e.g., establishing connections, authenticating users, tracking presence, exchanging messages, etc), as well as application-specific functionality (e.g., maintaining scores and statistics for a game application), which may be facilitated by certain aspects of the core functionality. Servers may be implemented via different software layers for communication, display and application-specific functionality.

In a preferred embodiment, server 125 includes the following key components: VBI Decoder 130 for extracting program-synchronous triggers from a broadcast program, Game Manager 135 for performing application-specific functionality relating to a game application (examples of which are discussed in greater detail below), Jabber Server 140 for managing communications with clients 175*a* and 175*b*, and Database 145 for storing various information relating to clients and their connections, as well as application-specific data such as game scores and statistics. It should be noted that these components could be implemented as part of a single server 125, or as separate hardware and software components that work together (e.g., as separate devices on a LAN or WAN).

During a synchronous event, trigger IDs are extracted from VBI Decoder 130 and delivered to Game Manager 135, which responds by generating the appropriate content which Jabber (communication) Server 140 delivers to the appropriate clients. Such information typically is delivered to two-screen Flash clients (such as client 175a) via the Internet 150, while set-top box clients can be handled in a variety of ways. For those set-top boxes with compatible client software, the events can be sent directly via the Internet 150. For non-compatible clients, the events can be sent indirectly via the Internet 150 through an MSO gateway 180, which can then translate the information into the appropriate format. Connections to MSO gateways could also be established via the Internet 150, as opposed to a direct point-to-point connection.

Application-specific data handling is performed in this embodiment via Game Manager 135, which utilizes Database 145 for event translation, score handling, user maintenance, and reporting. Due to the use of standard Jabber/XMPP protocols, Game Manager 135 can be implemented as a set of Jabber software modules, each handling different tasks, which greatly simplifies the development process, substantially reduces development time and facilitates compatibility both within and among ITV applications.

VBI Triggers

The core timing mechanism and trigger storage of a preferred embodiment of the present invention is achieved via program-synchronous triggers inserted into the program's broadcast. This technique enables triggers to be inserted "in time" with a broadcast. Though utilizing the VBI is essentially an analog hack for transmitting information, virtually all digital video encoding mechanisms (e.g., those from Norpack Corporation in Canada) offer similar functionality.

Advantages

Inserting triggers into the actual broadcast stream offers numerous advantages.

Triggers v Scheduling. Most currently deployed mechanisms rely on a scheduling mechanism based off a network's automation system for their synchronicity. This requires the maintenance of some sort of scheduling list. Inserting triggers into an actual program's broadcast eliminates this human element.

Triggering of Advertising. Because ads are independent of program data, most current program-synchronous applications cannot handle synchronous ads. By inserting triggers into the ads, there will be a seamless integration of various synchronous advertising units with program-synchronous applications.

Syndication. Because the trigger insertion does not require scheduling and has no ties to networks' proprietary automation systems, enhanced programs can continue to be enhanced in syndication with minimal effort. This also facilitates the ability of production houses external to the network to provide enhanced content.

Jabber Communication Layer

Jabber is an open set of protocols and technologies used to exchange messages in real time. In describing Jabber, it is important to note that Jabber is not any one thing; instead, it is a collection of different bits of technology that, in essence, establishes a set of rules governing how various applications work and interact with one another. Jabber was originally developed as an open alternative to closed Instant Messaging services such as AOL Instant Messenger (AIM)™ and Mirabalis' ICQ™. From the ground up, Jabber was designed to overcome many of the disadvantages of these proprietary systems, as well as to take advantage of various technological advances.

Utilizing Jabber in a preferred embodiment of the server provides several core services out of one box, including gaming, chat, IM, and ad tracking. At the heart of Jabber is XMPP, which defines the handling of standard tasks such as user authentication, presence, and messaging.

Advantages

It Exists. Perhaps Jabber's greatest strength is that Jabber has already been developed and is a proven technology. It has already been implemented on a variety of operating systems and for a multitude of uses. There are existing code libraries, as well as established development houses that can be used to bootstrap development efforts.

Designed for thin clients. Jabber has been designed for the server side to perform most of the heavy lifting. This translates well to the set-top-box paradigm: thin clients on a set-top box supported by a robust backend Scalable. Jabber has been designed from the ground up to be a distributed system. It is designed to make it easy to tie different implementations together in order to increase functionality. For example, a network could have its own implementation simply for providing two-screen functionality to its users. If they then want to expand for an MSO's set-top box implementation, they can simply place a gateway in front of the MSO's system for translation into their proprietary implementation.

Gateways to other application systems. Already in existence are servers that can convert Jabber communication to AIM, YahooIM, SMTP (e-mail) and other external messaging solutions.

Extensible functionality. While designed for IM and Chat, Jabber is well-suited for other applications, such as program-synchronous content, ad tracking, and providing real-time stock, weather and sports information.

Jabber Game Manager and Other Jabber Agents

Jabber is essentially a "dumb" (albeit highly extensible) system. It is not so much a server as a packet router which tells data where to go. Outside of user authentication and management, it does very little "thinking" in its day-to-day operation. The creation of add-on modules allows for increased functionality, and is what makes Jabber a much more robust system.

Essentially, these agents are simply automated users on the Jabber system similar to AIM's "chat bots". These agents can be written in a variety of programming languages and there are several code libraries available to bootstrap this process. Perhaps the most essential agent for the gaming platform of a preferred embodiment of the present invention is the Game-Manager agent. This agent handles game play, data handling and scoring during a program-synchronous game.

In order to increase functionality, a variety of additional agents handle different tasks such as user registration, the posting of high scores, and handling of requests for supplemental information (such as ad handling and ad trafficking).

Clients

The use of Flash for two-screen gaming and other aspects of the user interface provided by ITV applications provides several advantages:

Flexible UI. Flash applications are relatively easy to develop. Flash also offers all of the required functionality, wrapped in an extremely dynamic system for creating web-based user interfaces.

Existing Usable Code. Flash development efforts can be jumpstarted by utilizing the XMPP Implementation for Flash (XIFF) library.

Ubiquitous. According to macromedia.com, Flash is installed in 98% of all web browsers.

Flash does have some limitations. The main limitation is that it is not a secure client: there are many existing applications that allow for decompiling of Flash applications. An additional issue is the lack of SSL implementations over persistent socket connections, which means users with packet sniffing tools can intercept network traffic.

Client implementations of the gaming platform could be installed on set-top boxes as well as two-screen clients; or, given the extensible nature of the Jabber system and the use of standard XML packets over a TCP/IP socket, the communication layer could be ported to existing set-top box implementations (e.g., OCAP OnRamp J2ME-based boxes). Over time, it is expected that many set-top box systems will themselves include Flash implementations.

Content Management System

Figure 2:
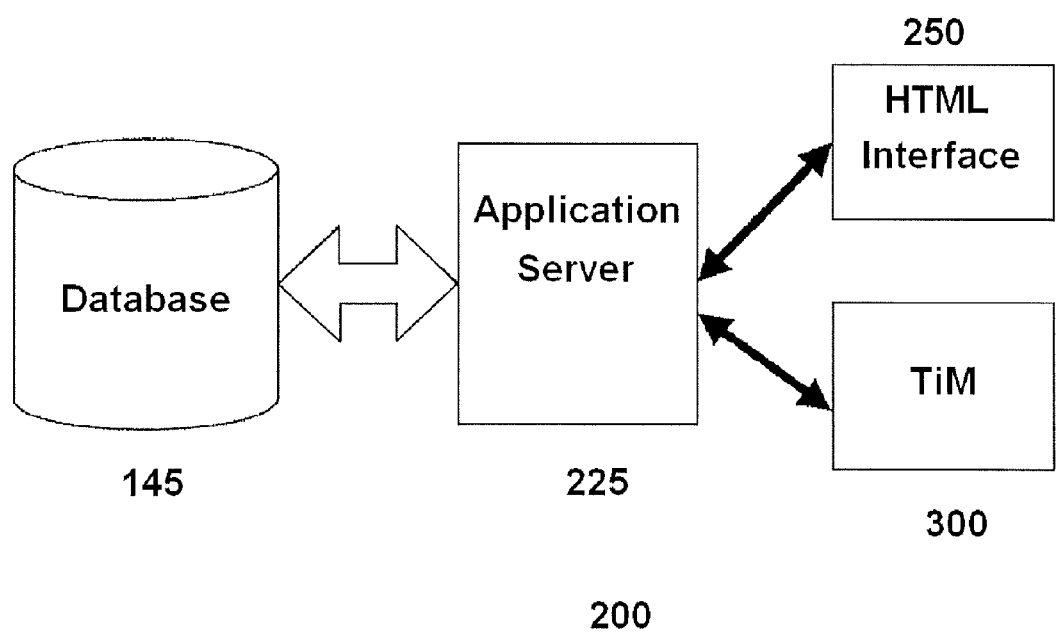
FIG. 2 illustrates key components of a Content Management System (CMS) of the present invention.

In order to manage the content related to a particular ITV application, as well as to core services such as client connections and chat, a preferred embodiment of the present invention includes a distinct content management system 200, illustrated in FIG. 2. CMS 200 includes three primary components.

The first is a database 145. This is where all the data is stored. The de-facto standards in this area are either Oracle on Unix-based systems (Linux, Solaris, and Debian, sometimes referred to as *nix). For Windows-based systems, either Oracle or MSSQL databases are preferred. There are open source and free database systems such as MySQL, PostgreSQL and Firebird; however, the commercial systems are generally more robust.

The second part of CMS 200 is an application server 225. There are a vast variety of application servers available running virtually any programming language. This is where the majority of the CMS development work is done. Currently in the front running for the primary application server on *nix-based enterprise level systems are Java Server Pages (usually running the Tomcat JSP engine), developed by the open source Apache development group. Application server 225 handles both business and display logic for most content management systems.

The final part of CMS 200 is the Content Management Application (CMA). CMA 250 is the interface that users utilize to insert, edit and delete data. This typically takes the form of a standard HTML web-based interface. In one embodiment, however, trigger management tool (TiM) 300 (discussed in greater detail below) would be a Flash application.

Trigger Manager

Figure 3:
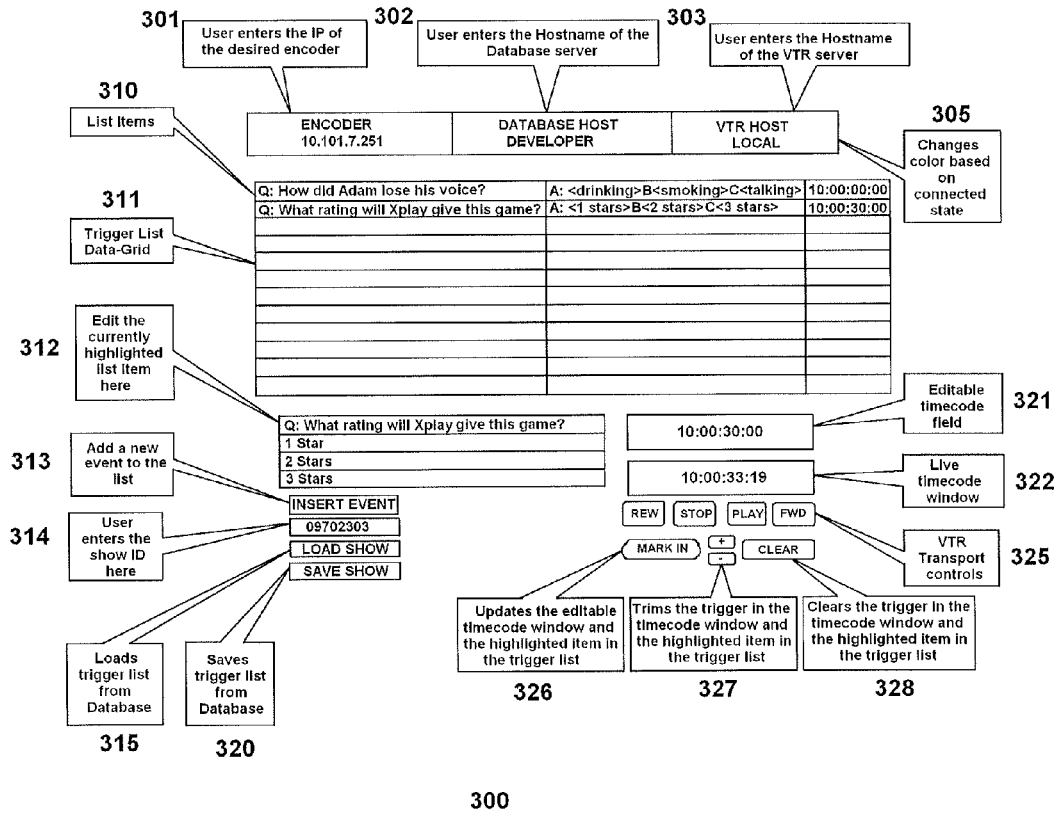
FIG. 3 illustrates a portion of the user interface of a Trigger Manager (TiM) of the present invention.

The Trigger Manager (TiM) 300, illustrated in FIG. 3, is the application used by the content producer to coordinate the interactive content and insert program-synchronous triggers into the broadcast. TiM is actually a collection of small parts in a preferred embodiment of the present invention. The first is its main UI, which is built in Flash. This interface is where the user enters data and seeks the necessary time placements for trigger insertion.

Utilizing Flash for trigger management offers several advantages to some current systems. The first: it is far superior to a standard web-based interface (currently used as GoldPocket's content producer). As a rich Internet application, it is an improved method for handling dynamic data. The second advantage: it is a deployed application across the web, making an entire system very easy to update.

In this embodiment, system "users" (i.e., authors of ITV applications) can select hostname and IP addresses of connected devices, such as the desired VBI encoder IP address 301, the Database hostname 302 and the hostname 303 of the VTR server (for recording the program with encoded program-synchronous triggers on videotape). The connected state 305 of these devices can be reflected, e.g., by a color change from red (disconnected) to green (connected).

Trigger-based events 310 can be listed in grid 311. Individual events can be edited in grid 312, while new events can be added via button 313 and assigned unique IDs 314. A particular list of triggers can be loaded and saved, respectively, via buttons 315 and 320.

Once the desired trigger events are created, they can be inserted into the appropriate portions of the program's videotape, via editable timecode field 321 (to jump to the appropriate point on the videotape), live timecode window 322 (showing the current location on the videotape) and VTR transport controls 325 (REW, STOP, PLAY, FFWD, etc). MARK IN button 326 updates the timecode and adds the highlighted trigger item to the appropriate point on the videotape. Buttons 327 trim the highlighted trigger (i.e., inserting it for a shorter or longer duration, making for a better fit with the program content), while button 328 clears the highlighted trigger.

Figure 4:
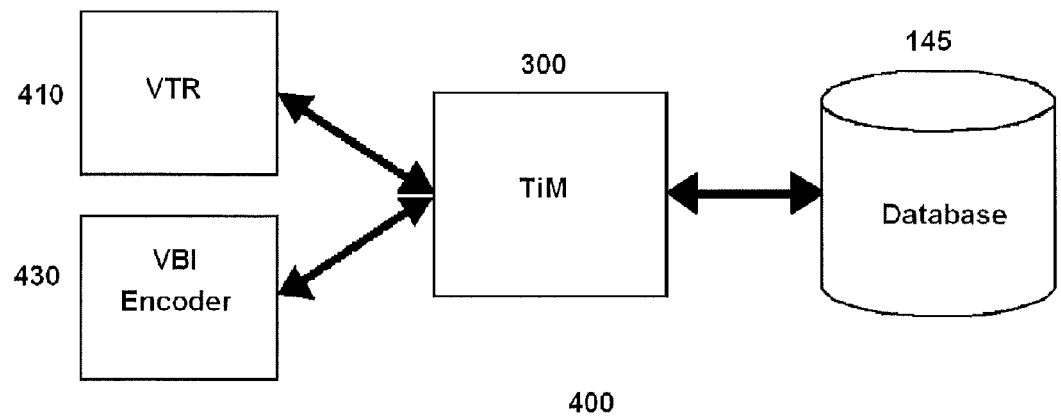
FIG. 4 illustrates the conceptual interaction between the TiM of the present invention and two server-based applications for encoding triggers into the VBI of a broadcast program and storing on videotape the broadcast program with these embedded program-synchronous triggers.

In addition to the Flash-based UI, there are a few small software components used to extend Flash's capabilities, illustrated in FIG. 4. They are two server applications in this embodiment: one 430 that the Flash-based UI connects to via a socket connection that controls the VBI Encoder, and a second small application 410 that controls the Video Tape Recorder (VTR).

Use Scenarios

To better illustrate how the components of the present invention work together, embodiments of various "use scenarios" in the context of a trivia game application are presented below, including a "two-screen" game, a "one-screen" set-top box game and a "one screen" "walled garden" (ie, limited content) game.

Two Screen Jabber Trivia Game Embodiment

Introduction

In the context of this "two-screen" program-synchronous gaming application, the client application is a web-based flash application, and communication is achieved via a TCP/IP connection. The application is a trivia game based on information supplied by the associated program. From the user's perspective, the user will launch the application prior to the start of the broadcast program. Once launched, the client application will logon and be authenticated with the Jabber server using a user-supplied username and password. At this point, there will be a persistent session created with constant communication between the client and server applications.

There will be three main types of client-server communication: Chat communication between the client application and the server, Trigger and Game information sent from the server to the client, and Presence information sent from the client to the server. All communication is asynchronous and is in the form of Jabber XMPP packets. Identification of all Jabber elements is in the form of a MD (Jabber ID).

Initialization

Opening of Communication Layer

Upon the start of the client application, a TCP/IP socket connection is made from a Flash client to the Jabber server. The client will have the ability to attempt to connect to a number of named servers in order. Server names can be maintained in a list local to the client. This will enable a client to overcome a service outage on the main Jabber server. If the client cannot connect to the primary listed server, the client will simply try one of the next listed backup servers.

The core of the communication will be handled via Flash's XMLHTTPSocket Objects and are transparent to the user. Once the communication layer is open, the first exchange of XMPP header packets are sent. These packets open and initialize the XMPP stream. The stream is not fully open, however, at this point. No messaging occurs until the registration and authentication phases are complete.

Registration Phase (Optional)

Immediately following the exchange of XMPP headers, the optional registration phase begins. In the case of an existing user, no registration occurs; instead, the process skips ahead to the authentication phase. All communication during this phase is accomplished via the XMPP protocol. To create an account, the client initially makes a request to discover which information is required from the server. The server then sends a list of required data. The client then responds with user-supplied data. The server then validates this data, and the registration is either denied or accepted. Following the registration phase, the client is passed to the authentication phase. At this point, there is still not a full session until the authentication is complete.

Authentication Phase

In the case of an existing user, where the registration phase is bypassed, authentication is performed via a user-supplied username and password. In the case where a new user is created, authentication is accomplished via a username and password supplied from the registration phase. In this phase, the username and password is passed to the server. The password can either be passed via plaintext or via a list of server-accepted encryption schemes. When authentication fails, the user can either re-enter user information or restart from the registration phase. Upon successful authentication, the user session is then created.

Queued Message Processing

Following successful authentication, any queued messages are then processed. These might be server-based "Message of The Day" messages, or currently active game events. At this point, the session is fully initialized and standard messaging can occur.

Gameplay

As noted above, gameplay involves three primary types of messaging: Chat, Gameplay messages and Presence messages. Chat messages enable game players to chat with one another during gameplay. In addition to handling existing substantive chat messages, chat room exploratory messages and room creation and administrative messages are also processed. Gameplay messages are handled via a specially defined type of XMPP Messaging packets and involve the required gameplay triggers and game data. Presence packets are used for two purposes. These packets are used by the server to determine whether or not the connection needs to be maintained, as well as for collecting usage statistics.

Chat

In a chat situation, there are two main types of Messaging packets. The first are "message" packets. Message packets can contain the following types of data. The recipient is specified in the form of a RD, which identifies the current chat room There is a "type" attribute that determines which type of packet is being sent. The "from" attribute identifies the chat room from which the message is sent. The "body" attribute contains the actual text of the message. Finally there is an "error" message for error messaging. The message packets are the core of chat communication. In one embodiment, a common message packet looks like the following:

---
Sample Chat Message Packet:
---

```
<message to='someone@gameserver.com"
    from='chatroom1@gameserver.com' type='message'>
        <body>Hey what's the next question?</body>
</message>
```

The second type of chat-related packets are Information Query (IQ) packets. These IQ packets are used by the client to query information from the server. In addition to the "to", "from", "body" and "error" types also common to message packets, the IQ packets can be used to modify state information on the server or to query the server for chat room and user information. IQ packets generally come in the form of "set" or "get" messages. "Get" messages are used to acquire information from the server, while "set" messages transmit information to the server.

---
Sample IQ Packet:
---

```
<iq id='get_roster_0001' type='get'>
    <query xmlns='jabber:iq:roster' />
</iq>
```

Chat messaging is extensible via custom development, though current Jabber chat-messaging protocols are sufficient for the functionality discussed in this embodiment.

Gameplay

In this embodiment, Gameplay messaging is implemented by extending existing Jabber messaging XML packets to add a new "game" message type attribute and extend "x" messaging child nodes. "X" child nodes describe a message child node that can use either Jabber-defined custom namespaces or user-defined namespaces. [Note: a namespace is defined by a colon in XML so <x:oop> would define an oop namespace, and x:stuntrocket another.]

Gameplay messaging includes 3 primary types in this embodiment: Server-to-Client communication of timed trigger events and event data, Client-to-Server communication of event responses and Server-to-Client communication of related game data such as high scores and ad updates.

Server-to-Client communication of timed trigger events and event data is sent synchronized with the program content. A trigger sent in the context of a two-screen game using a Flash client will synchronize the transmission of the question data with the associated broadcast. For one-screen set-top box applications, the question data will be preloaded and simply triggered by the event.

Event triggers will be read on playback of an encoded tape. As the episode is being broadcast, the event trigger will be read by the decoder. The VBI decoder will read the trigger from the tape and transmit the trigger to the Game Manager application. The Game Manager will then create a new game event message to transmit to attached clients.

---
Sample Game Event Message:
---

```
<message type='game' to='player@gamebox.com'
from='gamemanager@gamebox.com'>
    <x:channel:question>
        <question>What's the host wearing now?</question>
        <answer>A red shirt</answer>
        <answer>A purple shirt</answer>
```

| Sample Game Event Message: |
| --- |
| <answer>Nothing</answer><br>  </x:channel:question><br></message> |

Presence

The final type of messaging utilizes presence packets. Presence packets are used to manage players' availability and status during the game. Very basic in nature, these packets consist of two primary message components. The first is the "type" which sets a user's status. Sample values are "away", "present", "playing" and "chatting". The second is a "from" attribute that is used to identify the sender of the packet.

Sample Presence Packet:
<presence type='playing' from='player@gamebox.com'/>

One-Screen Trivia Embodiment

Introduction

In contrast to the two-screen Flash client discussed above, now consider a "one-screen" (e.g., set-top box client) program-synchronous gaming application in which the client application resides on a user's set-top box, and communication is performed via a broadcast carousel/socket connection.

The application is again a trivia game based on information supplied by the associated program. From the user's perspective, the application will be launched upon navigation to the appropriate channel. Once the application has been loaded and launched, the user is prompted to login. Authentication is performed by the Jabber communication server. Once authenticated, a persistent connection to the Jabber server is established, at which point the Jabber server exchanges the appropriate game data with the client application running on the client set-top box.

Once this point has been reached, there are again three primary forms of client-server communication. Chat communication between the client application and the server, Trigger and Game information sent from the server to the client, and Presence information sent from the client to the server. All communication is asynchronous and is in the form of Jabber XMPP packets. Identification of all Jabber elements is implemented via a JID (Jabber ID).

Communication Among the Set-top Box (STB), Jabber Server Farm, and Broadcase Facility Trigger Server Communication between the STB and the Jabber communication server is handled by one of two primary methods in this embodiment. STBs that contain an integrated cable modem (e.g., Cablevision) communicate via standard Internet protocols, including a standard TCP/IP connection. Otherwise, a broadcast carousel is used to transport applications and data.

This broadcast carousel method involves bundling, at the cable head-end, the associated application, data, and optional media sources, identified by unique Packet IDs (PID), all encoded into an MPEG stream for transport up the broadcast channel to the STB. The PIDs are used by the application to identify packets within the MPEG stream and are independent of the Jabber messaging packets.

Because access to these files typically is accomplished via a channel change, which can happen at any time, the application and data is constantly sent end to end. Packets can then be picked up mid stream and reassembled into an application and associated data once the carousel completes a circuit.

In certain systems (e.g., Satellite/Wink) which contain a limited back-channel for communication back to the head-end, this method has been used as a "store-and-forward" method where the application is fully loaded from the broadcast stream and allows for limited communication back, usually via a late-night call to a communication service. While this method is not preferable, many of the most advanced services (OCAP) still use a combination of these two services for handling full two-way communication. The application is streamed via the broadcast carousel to the STB where it can be assembled into an application. For return data, a socket connection can be established and data transmitted via TCP/IP. Once the socket connection is made, media data can still be pushed up the broadcast carousel while other forms of smaller data packets can then be pushed up the socket connection. Far preferable, however, are the fully integrated cable modem boxes (Cablevision) and the advanced back-channel (OCAP) boxes.

The standard method for communication via the broadcast carousel typically involves the following steps. Upon a channel change to the desired application channel, the STB begins assembling the application and storing all related resource data on the local file system. Once the application is loaded, the STB opens up a communication socket to a server located at the cable system's head-end. At this point, the server at the head-end opens up another socket connection to a Jabber server, either located local to the server or at a separate facility. Jabber XMPP packets are then transmitted from the Jabber server to the server located at the head-end.

At this point, the time-sensitive data can be transmitted back up the socket connection to the STB application. Other forms of communication (ad resources, images, audio/video elements, etc.) can also be bundled by the head-end server for transmission up the broadcast carousel. One key difference between this application and the walled garden application discussed below is the possible insertion of an additional Jabber server located at the originating broadcast facility.

Opening of Jabber Stream

Registration Phase (Optional)

Immediately following the exchange of XMPP headers, the optional registration phase begins. In the case of an existing user, no registration occurs; instead, the process skips ahead to the authentication phase. All communication at this phase is implemented via the XMPP protocol. To create an account, the client makes a request to discover which information is required from the server. The server then sends a list of required data. The client then responds with user-supplied data. The server then validates this data, and the registration is either denied or accepted. Following the registration phase, the client is passed to the authentication phase. At this point, there is still not a full session until authentication is complete.

Authentication Phase

In the case of an existing user where the registration phase is bypassed, authentication will be done via a user-supplied username and password. In the case where a new user is created, authentication is done via a username and password supplied from the registration phase. In this phase the username and password is passed to the server. The password can either be passed via plaintext or via a list of server accepted encryption schemes. When authentication fails the user can either re-enter their user information or restart from the registration phase. On successful authentication the user session is then created.

Queued Message Processing

Following successful authentication, any queued messages are then processed. In the case of a one-screen trivia application, this would be the requisite game data.

Gameplay/Chat/Presence Messaging

This messaging is accomplished in the same manner as discussed above with respect to the two-screen Flash application.

Triggers

One of the primary differences between the two-screen and one-screen applications is trigger handling. In the two-screen application, the triggers need to be processed by the Game Manager application located at the broadcast facility (in this embodiment) and then sent to the primary Jabber server farm for transmission to the attached clients via the Internet. The problem with this method is that there is a potential lack of synchronization between the reception of the triggers and the actual broadcast. In a one-screen application, there exist at least two methods of enabling tighter control of the synchronization between the trigger reception and the broadcast.

A preferred method is to integrate VBI-decoding functionality into the STB application layer. The triggers can then simply be read by the STB client itself as the broadcast is being played back. All content will already be loaded onto the box, ready for the appropriate trigger. Another preferred method is to have a VBI decoder at the head-end server. This server can then decode the triggers and transport them up the socket connection to the attached clients. Because of the proximity of the head-end server to the STB client, any lags will be negligible.

One-Screen Walled Garden Embodiment

Introduction

Finally we consider a "walled garden" application in which a customized news and information portal is accessible from a set-top box (STB) application. This STB application sports a custom user interface permitting the user can gain access to customized news, sports, stock and other information services.

Communication is performed in two phases. The first phase is communication between the STB and the Jabber communication server. The Jabber server can either be located at the Multiple Systems Operator's (MSO—cable operator) head-end or, via an MSO's communication routing system, located at a co-location facility. This server will then communicate via either HTTP or XMPP to other data retrieval services to retrieve customized data and information such as news, or sports scores, which can then be passed back up the broadcast carousel to the STB for display.

Communication between STB and Jabber Comm Server

Communication between the STB and the Jabber communication server is handled primarily by one of the two methods discussed above (standard Internet protocols for STBs containing an integrated cable modem, and the broadcast carousel for others).

Opening of Jabber Stream

The underlying communication layer will be opened as previously discussed. Following the opening of the communication layer, the standard steps for opening a Jabber stream are performed.

Registration Phase

In this embodiment, all STB applications will be started with a default user/password combination unique to the STB. Initial loading of the application will load this default user's preferred news set. During the initial load of the application, the registration phase will always be bypassed. Registration will only occur upon the creation of a new user once the application has been loaded.

Authentication Phase

During the initial load of the application, the authentication phase will be bypassed. On user change, the new user will be authenticated.

Queued Message Processing.

Once the authentication phase is complete, the queued message processing phase will occur. It is at this point that the client application will process all the message packets (e.g., from the broadcast carousel stream). These messages will consist of the default news data set in the form of XMPP message packets. These packets will be transported via the broadcast carousel in a data stream identified by a unique PID.

Application-Jabber Communication

Once the application has been loaded, there are three main types of news information that will be accessible. Static data is a set of data sent to all applications for use once the application launches. Custom data is created and added to the broadcast stream based on user preferences. Static and custom data are created and inserted into the broadcast stream and transported into the constantly updating broadcast carousel. Alert data is data pushed in the form of real-time alerts to a loaded application via the socket connection.

All data are stored in an XMPP packet format for use by the loaded client application. In the context of this application, while the applications still follows the standard method for creating a Jabber stream, some of the phases are simplified to be transparent to the user. Apart from the updating of user preferences (which are stored on the server), communication primarily involves pushing data to the user, with very little communication from the user to the Jabber server.

Standard Messaging

During standard operation, the client application can receive two main types of messaging packets. The first involves updates to the broadcast carousel. The client application constantly monitors the data stream identified by a PID that contains the currently stored news stories. When a change occurs in this data stream, the client application processes the XMPP-formatted messages and reloads the currently displayed news stories.

The alternate form of messaging involves real-time alerts based on communication over the socket connection. These alerts represent real-time data in the form of XMPP-formatted messages. Upon receipt of these messages, the client application signals the user and displays the new message accordingly.

Jabber Application Modules

The processing of data by the Jabber server utilizes three primary custom Jabber modules. The Jabber Portal Manager handles the processing of external news sources for creating the broadcast carousel data sets. The Jabber Alert module handles the real-time alerts. Finally, the Jabber Preferences Module handles the updating of user preference information.

Jabber Portal Manager Module

The Jabber Portal Manager is the primary application for data retrieval and packaging for insertion into the broadcast carousel. The Portal Manager resides as a daemon application on the Jabber server. The daemon regularly checks and retrieves news data from partnered news and information XML feeds. It packages this data as the appropriate XMPP packet data.

Once the data is packaged, the Portal Manager has two main tasks. First it creates a default data set for all client streams. This default data set is combined with preference-based data sets and then passed to the head-end server for the creation of the broadcast carousel streams. Once it accomplishes this task, it passes all packaged data to the Jabber Alert Module for the creation of custom alerts to be passed to the currently attached clients. These packets are transported from the Portal Manager to the Alert Manager as if from one user to another in a standard chat application.

Jabber Portal Manager Packets assume the following format in one embodiment:

```
<message to='foo@bar.com' type='normal'>
    <x xmlns:foo:topic>
        <x:foo:topic>Sports</x:foo:topic>
            <x:foo:topic>Baseball</x:foo:topic>
            <x:foo:topic>Barry Bonds</x:foo:topic>
    </x>
    <subject>News headline One</subject>
    <body>Yadda Yadda Yadda</body>
</message>
```

Jabber Alert Module

The Jabber Alert Module is another omnipresent software daemon that acts on an event model based on communication from the Jabber Portal Manager Module. When the Jabber Alert Module receives data from the Portal Manager, the Alert Module processes the incoming packet against the preferences list of the currently attached clients. When a match is discovered, the Alert Module re-addresses and forwards the packet to the head-end server, which then routes the packet via a socket connection to the appropriate attached client. Jabber Alert Packets utilize the same format as do Portal Manager Message packets, but with type='headline'.

Jabber Preferences Module

The Jabber Preferences Module is used for the storage of user preferences. All user preferences are stored on the Jabber Server for ease and security. When users updates their preferences, the updated preference data is sent, via the socket connection to the head-end, to the Jabber Server in the form of an XMPP "iq" packet. The data is sent in the form of a jabber:iq:private iq packet. This packet takes advantage of a built-in jabber mechanism for storing private user data (usually buddy lists) on the server itself.

These IQ packets assume the following format.

```
<iq id='private-89' type='set'>
    <query xmlns='jabber:iq:private'>
        <topics xmlns='news:topics'>Sports</topic>
        <topics xmlns='news:topics'>Baseball</topic>
        <topics xmlns='news:topics'>Barry Bonds</topic>
    </query>
</iq>
```

While we have illustrated and described various embodiments of this invention, these are by way of illustration only and various changes and modifications may be made within the contemplation of this invention and within the scope of the following claims.

What is claimed is:

1. A data processing method for enabling nodes of a client-server network to interact with broadcast program content, the method comprising:
   detecting, using a server node, the presence on the network of one or more client nodes;
   extracting, using a trigger extractor, program-synchronous triggers from within the content of a broadcast program;
   using an application manager, in response to extraction of a program-synchronous trigger from a broadcast program, facilitating interactive communication, relating to the broadcast program content, between the server node and one or more client nodes whose presence on the network has been detected by sending, from the server node to the one or more client nodes, data packets in Extensible Messaging and Presence Protocol (XMPP) and comprising trigger information based on the program-synchronous triggers and by receiving, from the one or more client nodes, other XMPP data packets comprising presence information relating to the one or more client nodes;
   using a game manager configured to perform application-specific functionality relating to a game, using a structured information exchange server configured to manage managing communications with the one or more client nodes, and using a database for storing information relating to the one or more client nodes and their connections;
   using the server node to extract, during a synchronous event, the program-synchronous triggers and to deliver the program-synchronous triggers to the game manager, and using the game manager to respond by generating content, and using the structured information exchange server to deliver the content to the one or more client nodes.

2. The method of claim 1, further comprising sending, from the server node to the one or more client nodes, additional XMPP data packets comprising game information.

3. The method of claim 1, further comprising sending and receiving, between the server node to the one or more client nodes, additional XMPP data packets comprising chat communication.

4. The method of claim 1, further comprising inserting the program-synchronous triggers into the broadcast program content before broadcasting the broadcast program over a broadcast medium.

5. The method of claim 1, wherein each of the one or more client nodes comprises any one or more of a personal computer, a two-screen Flash client, a set-top box, and/or an integrated computing device.

6. The method of claim 1, wherein the program-synchronous triggers are in advertising segments of the broadcast program.

7. The method of claim 1, further comprising using a structured information exchange server configured to manage communications with the one or more client nodes.

8. The system of claim 7, further comprising using a structured information exchange portal manager to process external news sources for creating broadcast carousel data sets; a structured information exchange alter module that is configured to process real-time alerts; and a structured information exchange preference module that is configured to process updating user preference information.

9. The method of claim 1, further comprising reading, during an enhanced broadcast, the program-synchronous triggers from a program videotape and sending the program-synchronous triggers to a structured information exchange Agent via a socket connection using an XMPP protocol, and using the structured information exchange Agent to translate the program-synchronous trigger into content and to a message to the structured information exchange Server, which broadcasts the message to each of the one or more client nodes.

10. The method of claim 1, further comprising inserting the program-synchronous triggers using a trigger manager comprising a Flash-based graphical user interface (GUI) that is configured to control playback on a video deck and to insert the program-synchronous triggers.

11. A data processing method for enabling nodes of a client-server network to interact with broadcast program content, the method comprising:

detecting the presence on the network of one or more client nodes;

extracting program-synchronous triggers from within the content of a broadcast program;

in response to extraction of a program-synchronous trigger from a broadcast program, facilitating interactive communication, relating to the broadcast program content, with one or more client nodes whose presence on the network has been detected by sending, to the one or more client nodes, data packets in Extensible Messaging and Presence Protocol (XMPP) and comprising trigger information based on the program-synchronous triggers and by receiving, from the one or more client nodes, other XMPP data packets comprising presence information relating to the one or more client nodes;

using a game manager configured to perform application-specific functionality relating to a game, using a structured information exchange server configured to manage managing communications with the one or more client nodes, and using a database for storing information relating to the one or more client nodes and their connections;

using the server node to extract, during a synchronous event, the program-synchronous triggers and to deliver the program-synchronous triggers to the game manager, and using the game manager to respond by generating content, and using the structured information exchange server to deliver the content to the one or more client nodes.

12. The method of claim 11, further comprising sending, from the server node to the one or more client nodes, additional XMPP data packets comprising game information.

13. The method of claim 11, further comprising sending and receiving, between the server node to the one or more client nodes, additional XMPP data packets comprising chat communication.

14. The method of claim 11, wherein the program-synchronous triggers are in advertising segments of the broadcast program.

15. The method of claim 11, further comprising using a structured information exchange server configured to manage communications with the one or more client nodes.

16. The method of claim 11, further comprising reading, during an enhanced broadcast, the program-synchronous triggers from a program videotape and sending the program-synchronous triggers to a structured information exchange Agent via a socket connection using an XMPP protocol, and using the structured information exchange Agent to translate the program-synchronous trigger into content and to a message to the structured information exchange Server, which broadcasts the message to each of the one or more client nodes.

* * * * *